United States Patent Office 3,532,950
Patented Oct. 6, 1970

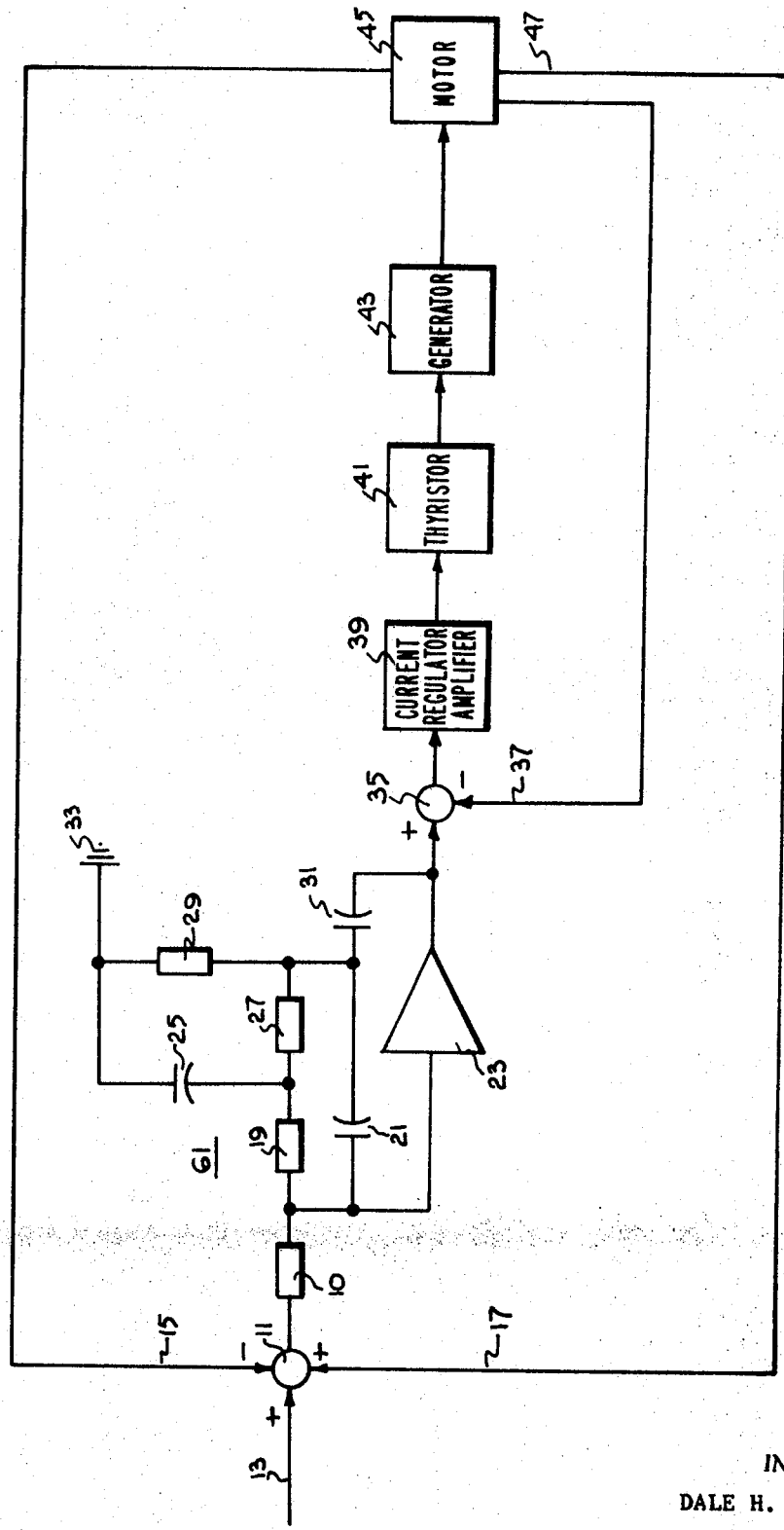

3,532,950
VOLTAGE REGULATOR FOR DIRECT CURRENT MOTOR WITH DRIVE CURRENT CONTROL
Dale H. Jackson, Salem, Va., assignor to General Electric Company, a corporation of New York
Filed Mar. 3, 1969, Ser. No. 803,873
Int. Cl. H02p 5/22
U.S. Cl. 318—142                                     1 Claim

ABSTRACT OF THE DISCLOSURE

An apparatus for compensating the resonant fluctuations in a voltage regulator control having an internal current feedback loop. The apparatus provides for a voltage rate feedback signal and a voltage drop compensating feedback signal derived from a direct current motor to be combined mathematically with a reference signal which corresponds to the speed of the motor. The resulting signal is applied to a compensating circuit having its output connected to a summing junction wherein the output is mathematically added to a current feedback signal from the motor. The resultant signal is applied to a current regulator amplifier which in turn controls a thyristor network affecting the generator field. The generator armature in turn applies current to the drive motor to be controlled, resulting in conditions wherein the compensating circuit causes the motor speed and terminal voltage to respond smoothly to changes in load and reference signal.

BACKGROUND OF THE INVENTION

In DC motors, such as those used in steel mills and equivalent operations the speed is often controlled by adjustment of the terminal voltage applied thereto. For maintaining constant speed and protecting the motor from extreme changes in voltage and load current, these voltage regulators are provided with various feedback signals, such as current feedback, IR compensation feedback and voltage rate feedback which together with a voltage reference signal, representing the desired speed of the motor, form an input signal to the regulator. Characteristics of most DC motors are such that step input, in other words, an incremental change in the input voltage of the motor, produces responses both in the voltage of the motor and in the current of the motor. The voltage of the motor appears relatively smooth with a change in speed by changes of terminal voltage; however, the current response of the motor with respect to the terminal voltage has a resonant character. Voltage regulators having an internal current feedback loop are affected by this resonant character. Voltage regulators having an internal current feedback loop are affected by this resonant current characteristic since the current feedback loop causes the resonant signal to be impressed onto the reference and feedback signals controlling the circuit of the regulator. An unstable effect in the voltage of the motor during transient speed conditions may thereby result.

BRIEF SUMMARY OF THE INVENTION

The present invention provides a voltage regulator having an internal current loop for controlling voltage wherein a compensating circuit is provided for modifying the input to the voltage controlling portion of the regulator so that the resonant characteristic introduced through the internal current feedback loop of a direct current motor current is compensated.

BRIEF DESCRIPTION OF THE DRAWING

The drawing is a circuit diagram illustrated a compensating circuit in a conventional voltage regulator having an internal current feedback loop.

DETAILED DESCRIPTION

Referring now to the drawing, summing junction 11 receives a voltage reference signal 13, a voltage rate feedback signal 15 and an IR compensating feedback signal 17. The polarity reference voltage signal 13 may be either positive or negative depending on the direction of the motor. The compensating signal 17 (armature current times armature impedance) aids reference signal 13 while the voltage rate feedback signal 15 is in opposition. The output voltage of the summing junction is connected through resistor 10 to resistor 19, one side of capacitor 21, and operational amplifier 23. Resistor 19 connects to one side of capacitor 25 and is connected through resistor 27 to resistor 29 and the junction of capacitor 21 and capacitor 31. The other sides of capacitor 25 and resistor 29 are jointly connected to a common ground 33. The output of operational amplifier 23 and capacitor 31 are connected to a summing junction 35. This summing junction 35 therefore receives a reference signal 13 in combination with the IR compensating feedback signal 17 and voltage rate feedback signal 15 through the aforesaid components and mathematically sums the resultant signal with a current feedback signal 37 derived from motor 45. The signal thus produced is applied to a current regulator amplifier 39 which is capable of selectively firing the thyristor control 41. The thyristors when conducting apply power to the field of generator 43 which then controls the voltage applied to the armature of motor 45 in proportion to the thyristor controlled current applied to the field of generator 43. Three signals, represented by numeral 47, derived from motor 45 form the compensating feedback signal 17, current feedback 37 and voltage rate feedback signal 15, respectively. The compensating feedback signal 17, which is responsive to the counter E.M.F. of motor 45 and is derived from a resistance in series with the motor or from special connections to the commutating field (not shown) on the motor, is applied to the summing junction 11 in the form of a voltage signal which aids voltage reference signal 13, as indicated by a + sign in the drawing. The voltage rate feedback signal 15 which is responsive to the rate of change of the voltage applied to motor 45 is an integrating voltage signal derived from the motor terminals through a capacitor of which the accumulated charge is a function of the change in terminal voltage with respect to the time duration of the change. This signal is applied to summing junction 11 where it opposes reference signal 13, as indicated by a — sign in the drawing. Current feedback signal 37, responsive to the input current of motor 45 and derived from the same source as the IR compensating signal, i.e., a resistor in series with the motor or special connections to the commutating field of the motor, but having a polarity in opposition thereof, is applied to summing junction 35 where it opposes the signal resulting from the compensating circuit 61, as indicated by the — sign in the drawing.

The function of compensation circuit 16 is described as follows: Under steady state conditions, capacitors 21, 31, and 25 simulate open circuit connections, whereby the operational amplifier, due to its high gain characteristics, is caused to saturate and apply maximum voltage to summing junction 35.

Under transient voltage input conditions, the capacitors 21 and 31 simulate shorted connections so that the operational amplifier 23 is short circuited causing no input voltage to be applied to summing junction 35. Resistors 19, 27, and 29 in combination with capictor 25 and ground 33 divert some of the voltage thereby modifying the resultant output of the operational amplifier 23 within the aforesaid extremes. The signal resulting from the combination of reference signal 13, voltage rate feedback signal 15, and compensating feedback signal 17, modified as described above may be expressed by the following transfer function equation:

$$\frac{V_o}{V_I} = \frac{67}{S}\left[\frac{\left(1+\frac{S}{6.7}\right)\left(1+\frac{S}{10}\right)}{1+0.1S+0.1S^2}\right]$$

wherein $V_o$ is voltage output of the compensating circuit; $V_I$ is voltage input of the compensating circuit and S may be considered to be the derivative of input function with respect to time. With respect to the voltage regulator, motor 45 presents two characteristics responsive to a change in speed or a change in loading: First a voltage response which is relatively smooth and secondly a current response which has a resonant characteristic. With the internal current feedback loop represented by 47 and 37, this resonant current characteristic is reflected into the voltage response of the motor, resulting in an undesirable resonant voltage condition including overshoot during speed changes of the motor.

In the present invention circuit 61 compensates for this resonant characteristic introduced by the current feedback loop of the control regulator, so that step function signals applied to the input of the regulator result in smooth and evenly controlled terminal voltage during speed transitions.

While the invention has been explained and described with the aid of particular embodiments thereof, it will be understood that the invention is not limited thereby and that many modifications retaining and utilizing the spirit thereof without departing essentially therefrom will occur to those skilled in the art in applying the invention to specific operating environments and conditions. It is therefore contemplated by the appended claim to cover all such modifications as fall within the scope and spirit of the invention.

What is claimed is:

1. A regulator for a direct current motor having its armature directly connected to the armature of a generator, said regulator having an internal feedback current regulation loop which produces a voltage signal proportional to the current in the motor armature, means for producing a voltage signal proportional to the rate of change in the armature voltage, and means for producing a voltage signal proportional to the product of armature current and amature impedance, comprising:

(a) a voltage reference signal;
(b) a first summing junction for equating the reference signal with the rate of voltage change and the product of armature current and impedance signal;
(c) means for modifying the output of said first summing junction; said means comprising an operational amplifier; a first and second capacitor connected in parallel with said amplifier, said second capacitor connected to said second summing junction point; a first resistor one end of which is connected to the junction of said first capacitor and operational amplifier and the other end of which is connected to said first summing junction; a second and third resistor connected in series with each other, said second resistor connected to said junction of said first capacitor and said operational amplifier, said third resistor connected to the junction point of said first and second capacitors; a third capacitor connected to the juction of said second and third resistor; a fourth resistor connected to the junction of said first and second capacitors at one end and connected to said third capacitor at the other end; and a ground connection connected to the junction of said third capacitor and said fourth resistor;
(d) a second summing junction point for equating said modified output with the current feedback signal;
(e) means for amplifying the output of said second summing junction point; and
(f) a thyristor bridge controlled by said amplified signal and connected to the field of the generator for controlling the voltage to the motor armature.

References Cited

UNITED STATES PATENTS 3,470,434  9/1969  Caputo _____ 318—158
3,470,438  9/1969  Traver et al. _____ 318—143

ORIS L. RADER, Primary Examiner

T. L. CROSSON, Assistant Examiner

U.S. Cl. X.R.

318—158